(12) United States Patent
Nurbegovic et al.

(10) Patent No.: US 10,347,062 B2
(45) Date of Patent: Jul. 9, 2019

(54) PERSONAL IDENTIFICATION FOR MULTI-STAGE INSPECTIONS OF PERSONS

(71) Applicant: Smiths Heimann GmbH, Wiesbaden (DE)

(72) Inventors: Emir Nurbegovic, Oppenheim (DE); Arthur Christian Meinhard Schuckmann, Bolzano, Alto Adige (IT)

(73) Assignee: SMITHS HEIMANN GMBH, Wiesbaden (DE)

( * ) Notice: Subject to any disclaimer, the term of this patent is extended or adjusted under 35 U.S.C. 154(b) by 0 days.

(21) Appl. No.: 15/534,629

(22) PCT Filed: Dec. 11, 2015

(86) PCT No.: PCT/EP2015/079421
§ 371 (c)(1),
(2) Date: Jun. 9, 2017

(87) PCT Pub. No.: WO2016/092072
PCT Pub. Date: Jun. 16, 2016

(65) Prior Publication Data
US 2017/0365118 A1    Dec. 21, 2017

(30) Foreign Application Priority Data

Dec. 11, 2014    (DE) .................. 10 2014 225 592

(51) Int. Cl.
*G06K 9/00*    (2006.01)
*G07C 9/00*    (2006.01)
(Continued)

(52) U.S. Cl.
CPC ....... *G07C 9/00158* (2013.01); *G01V 5/0008* (2013.01); *G01S 13/887* (2013.01); *G07C 2011/04* (2013.01)

(58) Field of Classification Search
CPC .......... G06K 9/00362; G06K 9/00369; G06K 9/00771; G06K 9/00671; G06K 2209/09; H04N 2005/2726; H04N 5/272; G06T 7/0002; G06T 2207/30196; G06T 2207/30232; G07C 9/00158; G01V 5/0008
See application file for complete search history.

(56) References Cited

U.S. PATENT DOCUMENTS 7,464,001 B1 *  12/2008  Adams ............... G06Q 10/06
                                               702/183
8,437,556 B1 *   5/2013  Saisan .............. G06K 9/00288
                                               382/103
(Continued)

FOREIGN PATENT DOCUMENTS

WO    2012039712 A1    3/2012

OTHER PUBLICATIONS

International Preliminary Report on Patentability dated Dec. 12, 2017 for PCT/EP2015/079421.
(Continued)

*Primary Examiner* — Amir Alavi
(74) *Attorney, Agent, or Firm* — Kevin E. West; Advent, LLP

(57) ABSTRACT

A multi-stage control system for inspection of a person includes at least one control device at a first location and at least a follow-up control device at a second location. The control device is configured to determine a follow-up control area of the person, store data defining the follow-up control area in a data set, generate a unique identification feature for the person based on a detected external feature of the person, and allocate the person to the data set. The follow-up control device comprises a display device for displaying a graphical representative of a person, and is configured to display a visually recognizable follow-up control area of the person for finding hidden objects in accordance with a data set allocated to the person. The follow-up control device can also be configured to generate the unique identification feature for the person based on a detected feature of the person.

15 Claims, 5 Drawing Sheets

(51) Int. Cl.
*G01V 5/00* (2006.01)
*G01S 13/88* (2006.01)
*G07C 11/00* (2006.01)

(56) References Cited

U.S. PATENT DOCUMENTS

| | | | |
|---|---|---|---|
| 9,291,741 B2* | 3/2016 | Gray | G01V 5/0025 |
| 9,552,521 B2* | 1/2017 | Chen | G06K 9/00771 |
| 2004/0252024 A1 | 12/2004 | Huey et al. | |
| 2005/0068165 A1 | 3/2005 | Kelliher et al. | |
| 2006/0087439 A1 | 4/2006 | Tolliver | |
| 2008/0122578 A1 | 5/2008 | Hoyos et al. | |
| 2008/0257949 A1* | 10/2008 | Hills | G06Q 10/08 |
| | | | 235/375 |
| 2010/0208972 A1* | 8/2010 | Bouchard | G01F 23/288 |
| | | | 382/132 |
| 2011/0051996 A1* | 3/2011 | Gudmundson | G01N 9/24 |
| | | | 382/100 |
| 2012/0038666 A1 | 2/2012 | Evers et al. | |
| 2016/0189096 A1* | 6/2016 | Tang | G01V 5/0033 |
| | | | 705/332 |
| 2017/0083768 A1* | 3/2017 | Xu | G06K 9/00671 |

OTHER PUBLICATIONS

International Search Report dated May 3, 2016 for PCT/EP2015/079421.

* cited by examiner

PERSONAL IDENTIFICATION FOR MULTI-STAGE INSPECTIONS OF PERSONS

The present disclosure relates in general to the field of security screenings of persons at transitions to areas having increased security requirements. In some aspects, the disclosure relates to options for uniquely identifying a person in multi-stage screening methods, in which individual persons undergo a follow-up screening when necessary at at least one further checkpoint, taking into account findings from at least one previous checkpoint, in order to ensure that the findings from the at least one previous checkpoint are reliably associated with the person who is to undergo a follow-up screening at the at least one further checkpoint.

BACKGROUND OF THE INVENTION

Security screenings can be conducted of persons upon entry into certain infrastructures, for example the departure area of airports, or buildings with increased security requirements (for example, courts, prisons, diamond mines, etc.), or for major events (for example, concerts, sports events, etc.). In the process, persons pass through a transition area (often referred to as a checkpoint or control point), at which the persons, and possibly hand-held items if present, are screened, for example, for hazardous or prohibited objects or substances that are worn concealed under the clothing, or concealed in the body.

Control points at airports can have so-called walk-through metal detectors, for example, which are designed in a manner similar to a free-standing door frame, into which highly sensitive metal detectors are integrated in order to detect metallic objects, such as weapons, carried in concealment on the body of a person to be screened, and to trigger an appropriate alarm. When an alarm is triggered, the person in question is subjected to a follow-up screening by security personnel, for example by means of a hand-held metal detector and/or manual scanning.

These control points represent a bottleneck with regard to throughput of persons, since follow-up screenings always require more time than automatic screenings via the walk-through metal detector.

Personal scanners can be used at such control points which scan the bodily surface of a person by means of electromagnetic radiation, the radiation penetrating essentially the clothing but not the person him/herself, and being reflected on the skin of the person. Based on the backscattered radiation, so-called backscatter images of the person may be generated, in which objects or substances that are worn concealed under the clothing may be identified.

To ensure the necessary probability of detection, the responsible certification bodies for such devices have required that the sensor data generated by a screened person be automatically evaluated, and that bodily areas possibly subject to a follow-up screening be indicated to security personnel as an alarm notification.

In order to decouple the throughput rate at the control point from the time requirements for the follow-up screening, follow-up screenings may be conducted at a second location by security personnel present there.

To protect the privacy rights of persons to be screened, detection results are recorded in anonymized form. Even for the above-mentioned backscatter scanners or millimeter wave scanners, there is no generation of realistic full-body images of a screened person by which the person could be identified. Instead, the bodily areas to be subjected to a follow-up screening are marked on standardized graphical representations (so-called avatars). Only information concerning the bodily areas to be subjected to a follow-up screening is obtainable from the avatar. Thus, it is possible, for example, for the person who is to undergo a follow-up screening to inadvertently exchange places in the waiting line on the way to the follow-up screening point. It is not possible for the security personnel at the follow-up screening point to unequivocally associate the graphical information, displayed there on a display device, with a specific person in the line. This may represent a potential security gap, which in the prior art is avoided by use of additional supervisory personnel in order to avoid waiting lines.

Some systems for controlling the movement of at least one person, who is screened at a control point, to a follow-up screening point comprise an X-ray screening system at the control point, having an entry area defined by walls and an entrance gate, and an exit area defined by walls and an exit gate. The gates are automatically controlled, based on a screening result at the control point, so that a person who has been screened and found to be safe is allowed to leave the screening area. Further gates and walls define an additional holding area for persons to be subjected to a follow-up screening, the holding area being designed so that persons who are to undergo a follow-up screening are individually led to the follow-up screening point. The above-described problem is avoided by the controlled separation of the persons who are to undergo a follow-up screening. However, the known system may have an adverse impact on the throughput at the control point, since as soon as the receiving capacity of the follow-up screening point is reached, the first control point is also blocked, resulting in delays. In addition, the holding area with walls and gates is unpleasant for passengers, who may possibly already be under stress, in particular when persons traveling together are separated thereby from fellow travelers.

Other systems can include acquiring a biometric profile for a person, for example a 3D model of the person or data for recognizing the face of the person, for contactless identification and tracking of the person in an area such as a stadium. For example, the biometric profile of authorized persons may be detected at the entrance to the stadium, so that unauthorized persons in the stadium may be identified due to the fact that no biometric profile for this person has been detected.

SUMMARY

The present disclosure relates to the automatic screening of a person and the bodily areas of the person possibly identified as suspicious, for which a follow-up screening is to be carried out, and generating a unique identification feature of the person based on externally accessible features of the person, which may be linked to a data set which defines the bodily area of the person provided for a follow-up screening, so that a unique association of the data that define the follow-up screening area with the associated person may be ensured at subsequent control points.

A first aspect of the disclosure relates to a screening device for automatically screening a person for concealed objects. The screening device has an inspection device for contactless screening of the person. The inspection device is configured for determining a follow-up screening area of the person and storing data defined by the follow-up screening area in a data set. According to the disclosure, it is provided that the screening device is further configured for generating, based on a detected external feature of the person, a unique identification feature for the person, and then associating it with the data set of the person.

By use of the unique identification feature, the potential security gap described above may be avoided, likewise without additional staffing. By means of the unique identification feature, it is thus possible at a follow-up screening point to (i) recognize by means of the identification feature the person, associated with the data set, who is to undergo a follow-up screening, and/or (ii) after newly generating the unique identification feature in the same way as at the first control point, to retrieve the associated data set of the person from the system or from the first control point corresponding to the identification feature.

In principle, the screening device may be configured for generating the identification feature before, during, or after the automatic screening of the person by means of the contactless inspection device.

The generated identification feature may be deleted immediately if no follow-up screening area is determined for a person who has just been screened. Alternatively, it is possible for the screening device to be configured for generating the identification feature only when, or as soon as, the contactless inspection device has determined a follow-up screening area for the person.

For detecting an external feature of the person, the screening device may have at least one detection unit, for example a sensor system that is suitable for detecting the feature. The detection unit may be part of the screening device, for example integrated into same or wirelessly connected thereto. The detection unit may be fixedly installed on the screening device, or alternatively as a mobile hand-held device, connected to the screening device by cable or wirelessly.

The detection unit may be configured for detecting at least one biometric feature of the person as the basis for the identification feature. The biometric feature may be one or more of the following features: the papillary pattern of a finger of the person, the hand geometry and/or the palm lines on a hand of the person, the iris structure and/or the retina structure of at least one eye of the person, the voice of the person, or a photograph, for example of the face, of the person.

In one particular embodiment, the screening device has at least one camera as a detection unit, or has a wired or wireless connection to same. The camera may be configured for generating a facial photograph of the person as the identification feature.

The camera may be a still camera or a video camera. For a video camera, for the required facial photograph a suitable single frame may be extracted by means of frame grabber software, for example. The camera may be a hand-held camera or photographic apparatus, or also a smart phone, personal digital assistant (FDA), or tablet computer, or in principle any mobile device having an integrated camera.

With regard to the connection between the detection device and the screening device, it has already been mentioned that this may be a wired or wireless connection. A connection that is established, for example, via USB, for example by means of a cable having an appropriately robust design, thereby the power supply to the camera or to the device containing the camera is thus ensured. With a fixed coupling of the cable ends to the particular device, the camera is additionally protected from theft. Alternatively, the detection device may be implemented by means of a short-range radio link, for example Bluetooth, Nearfield Communication (NFC), WLAN, etc.

If implementing the detection unit by means of a mobile camera, such as by means of a smart phone, it may be possible for the person to take the photograph of his/her face (i.e., the facial photograph) him/herself ("selfie"), possibly resulting in greater acceptance by the persons in question.

Alternatively, it is also possible to install one or more cameras as detection devices in the area of the waiting line in front of the first screening device. In this way, the facial image, which may possibly be required later, may already be automatically detected for persons to be screened who are in the waiting line in front of the screening device.

A photograph, in particular a facial photograph, as the unique identification feature for the persons may be used.

The user may be more likely to accept a facial photograph, since a photograph of a person's face is already used for similar purposes, for example for passports, identification documents, driver's licenses, health insurance cards, etc. Concerns for personal rights may be ruled out here, in particular when the photograph is deleted after the personal screening has concluded.

A facial photograph of a person to be screened is very current, since it has been taken only a few seconds or minutes previously. Therefore, a facial image as a biometric feature is particularly robust in this application context, which is often not the case for passport photographs, since the shape and texture of the human face change over time, which may result in large discrepancies between a fairly old passport photograph and the current appearance of a person. In any case, the use of a current facial photograph increases the security of the method in the context proposed here.

Additionally, a facial photograph may be acquired relatively easily without major technical measures that in particular are expensive.

Further, by using a facial photograph, no additional activities are required of the person to be screened at the follow-up screening point, since a facial photograph that is associated with the data set, when shown to the security personnel at the follow-up screening point, is immediately suitable for identifying and verifying the person who is to undergo a follow-up screening. When one of the other biometric features mentioned above is used, it may possibly have to be detected a second time at the follow-up screening point. However, depending on the technology or sensor system used, this is likewise not a problem with the current technical state of the art, for example for fingerprints.

In summary, a facial image of a person who is to undergo a follow-up screening represents a particular embodiment of the unique identification feature of the present disclosure, which may be easily integrated into multi-stage screening methods.

With regard to the contactless inspection device, it is noted that in principle it may be based on a physical method that allows automated and contactless screening of a person to be screened for hazardous or prohibited objects that are worn concealed in and/or under the clothing. In a first embodiment, the inspection device is configured for scanning the person to be screened, using X-rays or electromagnetic millimeter waves, and generating a backscatter image of the bodily surface of the person, for example of the front side and the back side of the person. In another embodiment, the inspection device is configured for scanning the person to be screened, using X-rays which penetrate the person and generate a transmission image of the person.

In one some embodiments of the screening device, it may be configured for generating, based on at least one feature of the person detected by means of the inspection device, the unique identification feature for the person, based thereon.

For example, an inspection device which scans the surface of the person to be screened with electromagnetic millimeter waves or X-rays may be configured to generate an image, for example of the face, of the person as a biometric identification feature. This identification feature, similarly as for a facial photograph, may be associated with the data set that defines a follow-up screening area of the person. Another biometric identification feature that may be obtained with high reliability from such a millimeter wave image is the gender of a person. The build/stature and/or the height and/or the estimated weight of the person may also be detected and evaluated as further biometric features. In this embodiment of the screening device, it takes on the task of the detection device, in a manner of speaking. This can be economically advantageous, since the detection device does not have to be implemented using additional hardware. In addition, the identification features of the "emulated" detection device are automatically associated with the data detected by the screening device.

A second aspect of the disclosure relates to a follow-up screening device having a display device for displaying a graphical representation of a person, the display device being configured for displaying, corresponding to a data set associated with the person, a follow-up screening area of the person in a visually recognizable manner in order to find possibly concealed objects.

According to the disclosure, the follow-up screening device according to a first variant may be configured, likewise based on a detected external feature of the person, for generating a unique identification feature for the person. The detected external feature and the identification feature generated on this basis are the same features that were used at a prior control point, i.e., one of the screening devices discussed above.

This embodiment is suited for designs in which, as an external feature of the person, a feature has been detected for which, based on the identification feature, security personnel are not directly able to identify the person who is to undergo a follow-up screening. The follow-up screening device may therefore be configured for verifying that a follow-up screening area that is already displayed on the display device is associated, by means of the identification feature that is newly generated at the follow-up screening device, with a person who is to undergo a follow-up screening.

After the unique identification feature is newly generated, it is also possible to use this feature to retrieve from a data source the data set, associated with the person, which defines the follow-up screening area, by means of the identification feature. The data source may be, for example, a central server of the control point to which the screening device of the first aspect has transmitted a data set together with the associated unique identification feature. Such a server for storing the screening data may be situated remotely from the control point and be connected to same in a known manner by a computer network (LAN and/or WAN). However, it is also possible, for example when multiple follow-up screening devices are associated with a certain screening device of the first aspect, to retrieve the associated data set by means of the identification feature directly from the associated screening device of the first aspect, via the follow-up screening device.

In other embodiments, the follow-up screening device may be configured for displaying an identification feature, which may be a photograph (e.g., a facial photograph), which is associated with the data set of a displayed follow-up screening area at the control point of the first aspect, for visual verification that the data set is associated with this person. In other words, in addition to the graphical representation of the person, on which the, or multiple, follow-up screening area(s) is/are graphically highlighted, the associated facial photograph of the person may be displayed on the display device to the security personnel at the follow-up screening device. It is thus possible, without further technical measures, for the security personnel to recognize/identify the person who is to undergo a follow-up screening.

In one particular embodiment, the detected biometric identification feature(s), provided that they are suitable for this purpose, are used to appropriately vary or modify the graphical representation (avatar). For example, one or more detected features of the person, such as height, build, gender, etc., could be used in the depiction of the avatar in order to appropriately adapt the avatar as a line drawing. For better orientation, a measuring bar could be depicted on the display unit, for example next to the avatar.

A third aspect of the disclosure relates to a multi-stage screening system having at least one screening device according to the first aspect of the disclosure, which is situated at a first location, and at least one follow-up screening point at a second location, having at least one follow-up screening device, for example multiple follow-up screening devices, according to the second aspect of the disclosure.

A fourth aspect of the disclosure relates to a method with automatic screening of a person for concealed objects by means of a contactless inspection method, wherein a follow-up screening area of the person is determined, and data that define the follow-up screening area are stored in a data set. According to the disclosure, the method also includes: detecting an external feature of the person; generating a unique identification feature for the person, which is based on the external feature; and associating the identification feature with the data set.

Corresponding to the devices discussed in detail above, detecting an external feature of the person may include detecting at least one biometric feature of the person, as discussed in conjunction with the first aspect.

In principle, the identification feature may be generated each time for a screened person before, during, or after the automatic screening of the person. In any case, it is possible to immediately delete the generated identification feature as soon as it is established that no follow-up screening area has been determined for the person.

It is also possible to generate the identification feature only when, or as soon as, a follow-up screening area is determined for the person in the step of the automatic screening of the person.

As likewise already explained in conjunction with the first aspect, during the automatic screening of the person, the person to be screened may be scanned with X-rays or electromagnetic millimeter waves, and on this basis a backscatter image of the bodily surface of the person may be generated. It is also possible to scan the person to be screened with X-rays, and on this basis to generate a transmission image (X-ray image) of the person.

It is likewise possible, by means of the contactless inspection method for detected features of the person, to generate the identification feature for the person, based thereon. With regard to further particulars or examples, reference is made to the discussion in conjunction with the first aspect of the disclosure.

A fifth aspect of the disclosure relates to a method for a follow-up screening of a person in order to find concealed objects, with display of the graphical representation of the person, wherein a follow-up screening area is displayed on the graphical representation in a visually recognizable manner, corresponding to a data set that is associated with the person.

According to the disclosure, in some implementations, the method includes: generating a unique identification feature for the person, based on an external feature of the person.

As already explained in conjunction with the first aspect, the same feature may be detected, and on this basis the same identification feature is generated, as in the method according to the fourth aspect of the disclosure. It is thus possible to verify, by means of the identification feature, that the follow-up screening area displayed on the display device is associated with a person. Alternatively, based on the identification feature, the associated data set may be identified at a data source and retrieved therefrom.

According to a second alternative of the method, the following may take place: displaying an identification feature, in particular a photograph (e.g., a facial photograph), of the person, which is associated with the data set of a displayed follow-up screening area at another control point, and on this basis, visually verifying that the data set is associated with the person.

Lastly, a sixth aspect of the disclosure relates to a two-stage screening method, having a first stage using a method according to the fourth aspect of the disclosure and a second stage using a method according to the fifth aspect of the disclosure.

BRIEF DESCRIPTION OF THE DRAWINGS

Further advantages, features, and particulars of the disclosure result from the following description, in which one exemplary embodiment of the disclosure is described in detail with reference to the drawings. The features mentioned in the claims and in the description may in each case be essential to the disclosure, alone or in any combination. Likewise, the features described above and to be further explained below may each be used individually or collectively in any combination. Functionally equivalent or identical parts or components are sometimes provided with the same reference numerals. The terms "left," "right," "top," and "bottom" used in the description of the exemplary embodiments refer to the drawings in an orientation in which the figure numbers or reference numerals are normally readable. The embodiments shown and described are not to be construed as an exhaustive listing, but, rather, are exemplary in nature for describing the disclosure. The detailed description is used for the information of those skilled in the art; therefore, known circuits, structures, and methods are not described or explained in detail in the description in order to not complicate understanding of the present description.

DETAILED DESCRIPTION

Figure 1:
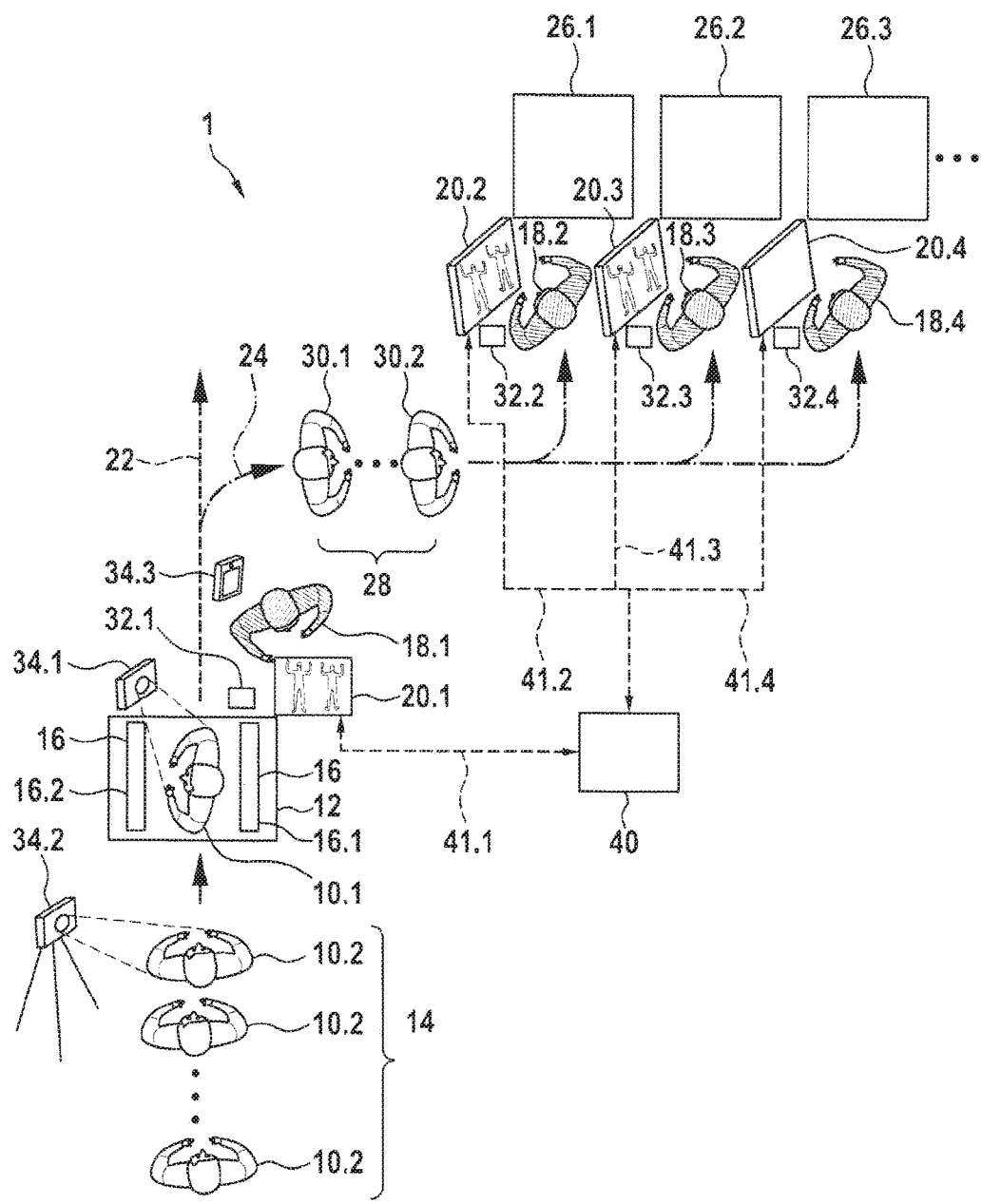
FIG. 1 shows a greatly simplified top view of a multi-stage method for screening persons by means of a screening device and multiple follow-up screening devices.

FIG. 1 shows a top view of a schematic illustration of a multi-stage security check 1 for persons at the transition into an infrastructure area having increased security requirements. This may be, for example, an entry point at an airport for airline passengers at the security area.

Within the scope of the security check 1, the carry-on luggage and possibly the shoes of passengers (not illustrated) are screened in a known manner. The carry-on luggage, jackets, shoes, and other objects carried by the passenger are generally inspected by X-ray. In the process, objects and substances inside the carry-on luggage, for example, are made visible, and screening is conducted for concealed or hidden dangerous contents such as weapons, prohibited objects, or hazardous substances.

In addition to the screening of the carry-on luggage described above, there is likewise screening of the passengers for hazardous or prohibited objects which the passenger is carrying in concealment on his/her body or in the clothing.

For this purpose, a passenger 10.1 is initially subjected to an automatic screening for concealed objects at a first location, by means of a first screening device 12. Additional passengers 10.2, in particular at peak traffic periods, wait in a waiting line 14 in front of the particular first screening device 12 until their turn comes.

In FIG. 1, the passenger 10.1 is situated in the first screening device 12 in order to be automatically and contactlessly inspected therein for concealed objects by means of an inspection device 16 integrated into the screening device 12. Depending on the principle and design, the inspection device 16 may have one or more units 16.1, 16.2. For example, each unit 16.1, 16.2 may be a transmitter/receiver unit for X-rays or electromagnetic millimeter waves, one of the units scanning one side of the body of the person 10.1, and the other unit scanning the other side of the body of the person 10.1. For example, the first unit 16.1 may be a source for X-rays for penetration scanning of the person 10.1. The second unit 16.2 is then a corresponding detector unit which detects radiation that is not absorbed by the person, in order to generate an appropriate transmission image (X-ray image) of the person 10.1. Two possible exemplary embodiments of such a screening device 12 are explained in greater detail in conjunction with FIGS. 2 and 3.

The screening device 12 is generally attended to by at least one security agent 18.1. Inspection information concerning the person 10.1 being screened at that moment in the screening device 12 is displayed to the security agent 18.1 via a display device 20.1 that is integrated into the screening device 12 (or alternatively, operatively connected thereto).

The screening device 12 automatically carries out the inspection of the person 10.1, wherein all inspection information generated concerning the person 10.1 is automatically evaluated on the device by program control, i.e., by means of appropriate software programs. If the result of the automatic screening of the person 10.1 shows that, based on the security threshold required by applicable regulations, it may be assumed that the screened person is not carrying any hazardous or prohibited objects in concealment, the security agent 18.1 is signaled on the display unit 20.1, for example by means of a green screen, that the person is not of special interest. The person 10.1 may then, for example, walk on the path 22 into the secured area. The person 10.1 may also pick up his/her screened baggage (if present) beforehand, and, retaining the example of the airport, proceed to the appropriate departure gate in the secured area.

However, if the screening device 12 establishes, based on the automatic screening of the person 10.1, that the person 10.1 is possibly carrying hidden objects on the body concealed by the clothing or in the clothing, an appropriate alarm notification is displayed to the security agent 18.1 on the display unit 20.1. Accordingly, the person 10.1 must be submitted to a follow-up screening by a security agent 18.2, 18.3, or 18.4. That is, the passenger 10.1 must walk on the path 24 to the appropriate follow-up screening devices 26.1, 26.2, 26.3. At that location the passenger 10.1 is then subjected to a follow-up screening, for example with manual scanning, accompanied by a bodily inspection, to rule out the presence of hazardous or prohibited objects on the person 10.1.

As discussed above, the follow-up screening takes place at a second location that is different from the first location of the screening device 12, so as not to adversely impact the throughput at the first screening device 12 due to the follow-up screenings.

Since the follow-up screening of a person 10.1 generally takes considerably more time than the automatic screening with the first screening device 12, a waiting line 28 with passengers 30.1, 30.2 to be subjected to a follow-up screening may also form in front of the follow-up screening devices.

In principle, a person 10.1 or 30.1, 30.2 classified as "of special interest" by the first screening device 12 could be subjected to a full bodily follow-up screening at one of the follow-up screening devices 26.1, 26.2, 26.3. However, this would unnecessarily increase the time for the follow-up screening, and in addition the findings already obtained by use of the first screening device 12 would go unused. For this reason, the screening device 12 displays on the display unit 20.1, on a graphical representation of the screened person 10.1, the bodily area or optionally the bodily areas for which the automatic inspection device has acquired information concerning the presence of concealed objects. One example of such a graphical display is discussed in greater detail below in conjunction with FIG. 4.

One problem with regard to an efficient screening process is ensuring that the screening information obtained at the control point 12 concerning the automatically inspected person 10.1, as the basis for the follow-up screening by a security agent 18.2, 18.3, 18.4 waiting at the follow-up screening devices 26.1, 26.2, 26.3, is transmitted in such a way that the screening information at that location is associated with the correct person.

For this reason, likewise provided at each follow-up screening device 26.1, 26.2, 26.3 is a display unit 20.2, 20.3, 20.4 on which the follow-up screening areas for the follow-up screening, associated with the person, for example 30.1 or 30.2, who is to undergo a follow-up screening, and determined by the first screening device 12, are displayed to the security agent 18.2, 18.3, 18.4 present at that location. That is, the data defining the follow-up screening area of a person 10.1, 30.1, 30.2 who is to undergo a follow-up screening have been stored in a respective data set at the first screening device 12. If these data are relayed, merely corresponding to the chronology of their detection, to a particular follow-up screening device 26.1, 26.2, 26.3 that becomes free, it can be ensured that the person associated with the particular data set goes to the "correct" follow-up screening device 26.1, 26.2, 26.3 only when there is no waiting line 28 on the path to that location. However, if a waiting line 28 has formed, i.e., if at least two persons who are to undergo a follow-up screening 30.1, 30.2 are waiting in front of the follow-up screening devices 26.1, 26.2, 26.3, as the result of the persons 30.1, 30.2 intentionally or also unintentionally exchanging places in the waiting line 28 it is possible that a person 30.1, 30.2 who is to undergo a follow-up screening does not go to the follow-up screening device 26.1, 26.2 to which the data defining the follow-up screening areas associated with that person have been transmitted. In the prior art, this possible security gap is closed, for example, by appropriate staffing to avoid waiting lines.

In principle, a plurality of measures may be taken, for example to denote a person 10.1 of special interest at the first screening device 12 with an identification feature, so that this identification feature, as an assignment criterion, could be used in a largely tamper-proof manner at one of the follow-up screening devices 26.1, 26.2, 26.3. For example, a tamper-proof band on which a machine-readable barcode is present as an identification feature could be printed out at the first screening device 12. This band could be affixed to the wrist of the person 10.1, so that, based on this identification feature, the person 10.1 may be uniquely identified at one of the follow-up screening devices 26.1, 26.2, 26.3. Based on the identification feature, the correct data set that defines the associated follow-up screening area could also be retrieved. However, this approach is not optimal. First of all, producing and affixing such a security band would mean an additional material and time expenditure. Additional malfunctions may occur with extra technical equipment. In addition, it cannot be ruled out that such a physical identification feature could still be intentionally exchanged between persons 30.1, 30.2 waiting in a line.

A different approach is therefore proposed below. To this end, it is provided that the screening device 12 is additionally configured for generating, based on a detectable external feature of the person 10.1, a unique identification feature for the person 10.1, based thereon. The identification feature is then associated with the data set of the person 10.1 which determines the follow-up screening area of the person 10.1, as has been determined by the screening device 12 based on the contactless inspection method.

The detectable external feature of the person 10.1 can be at least one biometric feature of the person 10.1 which directly represents the identification feature or is used as the basis for generating same. For this purpose, the screening device 12 may be equipped with an appropriate detection unit or be connected to same.

The following are particularly suitable here as externally detectable biometric features: the papillary pattern of a finger of the person (fingerprints), the hand geometry and/or the palm lines on a hand of the person 10.1, the iris structure and/or the retina structure of at least one eye of the person 10.1, or the voice of the person 10.1. These biometric features may be detected at the screening device 12 using a detection unit 32.1, known to those skilled in the art, for the biometric feature in question. For example, the detection unit 32.1 may be a scanner for fingerprints or palm lines, an optical detector for scanning the iris structure and/or the retina structure of an eye, or an acoustic recording device for recording voices.

The screening device 12 is configured for generating, based on the detected external feature, i.e., the biometric feature of the person 10.1, the unique identification feature for the person 10.1, based thereon, and associating the data set, which determines the follow-up screening area for the person, with the person 10.1.

According to this variant, appropriate detection units 32.2 through 32.4 are likewise provided at the follow-up screening devices 26.1 through 26.3. Correspondingly, the follow-up screening devices 26.1 through 26.3 are also configured for generating, based on the detected external biometric feature of the person 10.1, the corresponding unique identification feature for the person 10.1, based thereon.

Based on the identification feature, the follow-up screening device 26.1 through 26.3 may then verify that a follow-up screening area displayed on the particular display unit 20.2 through 20.4 is associated with the person who is approaching for the follow-up screening.

Alternatively, it is possible for the follow-up screening device 26.1 through 26.3 to be configured so that it identifies, based on the identification feature, the associated data set at a data source and then retrieves it from that location. The data source may be, for example, a central data server 40 at the control point 1, or may be the first screening device 12 itself. The data server 40 for storing the data sets (screening data) may be situated spatially remotely from the control point 1, and may be connected thereto in a known manner via a computer network (LAN and/or WAN).

The approach explained in conjunction with the detection units 32.1 through 32.4 reduces the staffing necessary for avoiding waiting lines, but requires additional material expenditure in the form of the mentioned detection units 32.1 through 32.4. In addition, the detection of the mentioned biometric features represents an acceptance problem for the affected persons, since they must basically trust that detected biometric data will in fact be deleted after use.

Therefore, in one particular embodiment, as a biometric feature an image of the person 10.1 automatically inspected in the first screening device 12, in particular the face of the person 10.1, is generated as an identification feature. For this purpose, an appropriate image acquisition unit, for example at least one of the cameras 34.1, 34.2, 34.3, is provided at the first screening device 12.

An image acquisition unit, as a camera 34.1, may be integrated into the screening device 12 or be mounted on same, so that the person 10.1 may be photographed before, during, or after the automatic screening by means of the contactless inspection device.

Alternatively or additionally, an image acquisition unit in the form of the camera 34.2 may be set up, in the open or concealed, in the area of the waiting line 14. By use of the camera 34.2, an appropriate image of the person may already be acquired before entry into the screening device 12.

Alternatively or additionally, a mobile camera 34.3 may be used as the image acquisition unit. In the example in FIG. 1, the security agent 18.1 who is attending to the screening device 12 keeps ready a smart phone (or tablet computer) with an integrated camera 34.3, which is connected to the screening device 12 via Bluetooth, for example. If necessary, i.e., if an alarm is triggered by automatic threat recognition (ATR) software of the inspection device 16 for the screening device 12, the security agent creates an image of the person 10.1.

Alternatively, the security agent 18.1 could hand the smart phone or the tablet computer with the integrated camera 34.3 to the person 10.1. The person 10.1 can then take a facial photograph (selfie) of him/herself.

Using an image of the face of the person 10.1 as a unique identification feature for the person 10.1 additionally greatly simplifies the method described above. Here as well, the screening device 12 is configured for associating the image of the face of the person 10.1 as an identification feature with the data set, which determines the follow-up screening area of the person 10.1, and transmitting same as a data source for the data sets to one of the follow-up screening devices 26.1 through 26.3 or a central data server 40. The data server 40 is connected in a known manner to the screening device 12 and to the follow-up screening devices 26.1 through 26.3 via a computer network (LAN and/or WAN), and may therefore be situated in the area of the control point 1 or spatially remotely from same.

For example, the screening device 12 may transmit the data set to the follow-up screening device 26.1 through 26.3, which is displayed to the system as available. In the example in FIG. 1, the display unit 20.4 of the follow-up screening device 26.3 is illustrated with empty display content. In the example, this symbolizes that the follow-up screening device is available. Accordingly, the screening device 12 may transmit a data set which determines the follow-up screening area for the person 10.1, together with the image of the face of the person 10.1, as an identification feature to the follow-up screening device 26.3 for display on the display unit 20.4.

Alternatively, the unoccupied follow-up screening device 26.3 could retrieve the next data set of a person who is to undergo a follow-up screening 10.1 from the screening device 12 or the central data server 40. The screening device 12 may then display the follow-up screening area for the person 10.1, which is determined by the retrieved data set, together with the image of the face of the person 10.1, as an identification feature on the display unit 20.4.

In both cases, the security agent 18.4 at the follow-up screening device 26.3 may thus immediately identify or recognize the passenger in the waiting line 28 who is to be subjected to a follow-up screening by that security agent, and accept that passenger for the follow-up screening.

In one particular refinement of the system, the first screening device 12 is configured for generating, based on the inspection data concerning the inspected person 10.1 that have been detected by means of the contactless inspection device 16, the identification feature for the person. It is likewise possible for the first screening device 12 to be configured for determining, based on the inspection data concerning the inspected person 10.1 that have been detected by means of the contactless inspection device 16, as an identification feature as an alternative or in addition to a representation or an image of the person, one or more of the following features: the gender of the person 10.1, the build of the person 10.1, the height of the person 10.1, or the estimated weight of the person 10.1.

For example, an image of the face of the person 10.1 may be used as an identification feature. An image of the face may be generated, for example, based on surface scanning of the person 10.1, using reflected X-rays or millimeter waves. With appropriate quality, for example the graphical representation of the person 10.1, which is displayed on the display unit 20.1 or one of the display units 20.2 through 20.4 at one of the follow-up screening devices 26.1 through 26.3, may be displayed with an image of the face of the person 10.1.

Alternatively or additionally, one or more of the following features may be used as an identification feature: the gender of the person 10.1, the build of the person 10.1, the height of the person 10.1, or the estimated weight of the person 10.1.

Accordingly, the graphical representation (avatar) of the person 10.1, which is displayed on the display unit 20.1 or one of the display units 20.2 through 20.4 at one of the follow-up screening devices 26.1 through 26.3, may be appropriately modified, i.e., adapted according to the identification features used. The avatar as a line drawing could be depicted, for example, corresponding to the person as a thin or heavyset man. In addition, the avatar could also be adapted to the height of the person; for example, a measuring bar could be depicted next to the avatar.

It is thus possible once again for the security agents 18.2 through 18.4 at the follow-up screening devices 26.1 through 26.3 to immediately identify a person who is to undergo a follow-up screening.

Figure 2:
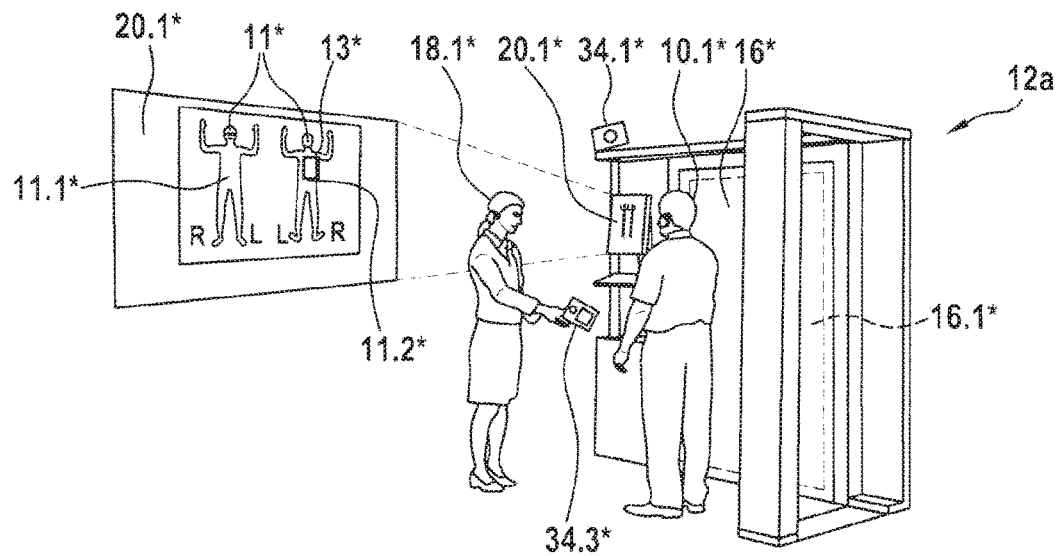
FIG. 2 shows a first exemplary embodiment of a screening device for automatically screening a person for concealed objects, with an inspection device for contactless inspection of the person.

FIG. 2 shows a first possible exemplary embodiment for a first screening device 12a. The screening device 12a is equipped for automatically screening the person 10.1 for objects concealed under or in the clothing, using an inspection device 16 for contactless inspection of the person 10.1 by means of millimeter waves. Millimeter waves lie in the electromagnetic spectrum between radio waves and infrared waves, and have the unique property of penetrating lightweight materials such as garment fabrics, but being reflected on objects and the skin of the person 10.1. Areas on the person 10.1 in which objects such as weapons or contraband are possibly concealed under or in the clothing of the person 10.1 may be detected in this way.

FIG. 2 shows a first example of a screening device 12 (in FIG. 1). The screening device 12a in FIG. 2, as an inspection device 16* for contactless inspection of the person 10.1*, has a flat-panel assembly with a phased array antenna field 16.1* for transmitting millimeter waves into the volume in front of the assembly. The millimeter waves reflected by the body of the person 10.1* are received by the phased array antenna field 16.1*. The inspection data detected via the 3D volume in front of the flat-panel assembly are automatically processed in real time, using appropriately programmed software algorithms, by an appropriately programmable control device, for example in the form of a computer, for the screening device 12a.

To protect the privacy of the inspected person 10.1, the representation of the results of the screening operation takes place automatically and anonymously. That is, in the course of the automatic screening, the screening device 12a automatically identifies the position of concealed objects by means of the specialized data processing algorithms, and displays same on the display unit 20.1*, on an avatar as a graphical representation of the person 10.1*. The positions 13* marked on the graphical representation correspond to bodily areas, which as follow-up screening areas of the person 10.1* are to be screened once again for concealed objects in a follow-up screening.

The display content of the display unit 10.1* is illustrated in enlarged form at the left in FIG. 2 in order to better discern the content. The display content 20.1* is made up of two general graphical depictions of the graphical representation 11*, namely, a front view 11.1* and a rear view 11.2*. The location where the inspection device 16* has identified a possibly concealed object is thus displayed to the security agent 18.1*.

As explained in conjunction with FIG. 1, at least one image acquisition unit in the form of a camera 34.1* may be installed at the screening device 12a. The camera 34.1* is, for example, configured for taking a facial photograph of the person 10.1* as a unique identification feature for the person 10.1*, in the event that an area 13* to be subjected to a follow-up screening is identified during the automatic inspection of the person 10.1*.

Alternatively or additionally, a mobile image acquisition unit in the form of a smart phone or a tablet computer with an integrated camera 34.3* may be provided at the screening device 12a. The security agent 18.1* may then capture a facial image of the person 10.1* as an identification feature, using the mobile camera 34.3*, if necessary (for example, in the event of an ATR alarm). Alternatively, it may be possible for the person 10.1* to use the mobile camera 34.3* to take a facial photograph (selfie) of him/herself. The mobile camera 34.3* may be connected to the screening device 12a via a known short-range radio link, for example Bluetooth or NFC. However, a cable connection via Universal Synchronous Bus (USB) is also possible.

Figure 3:
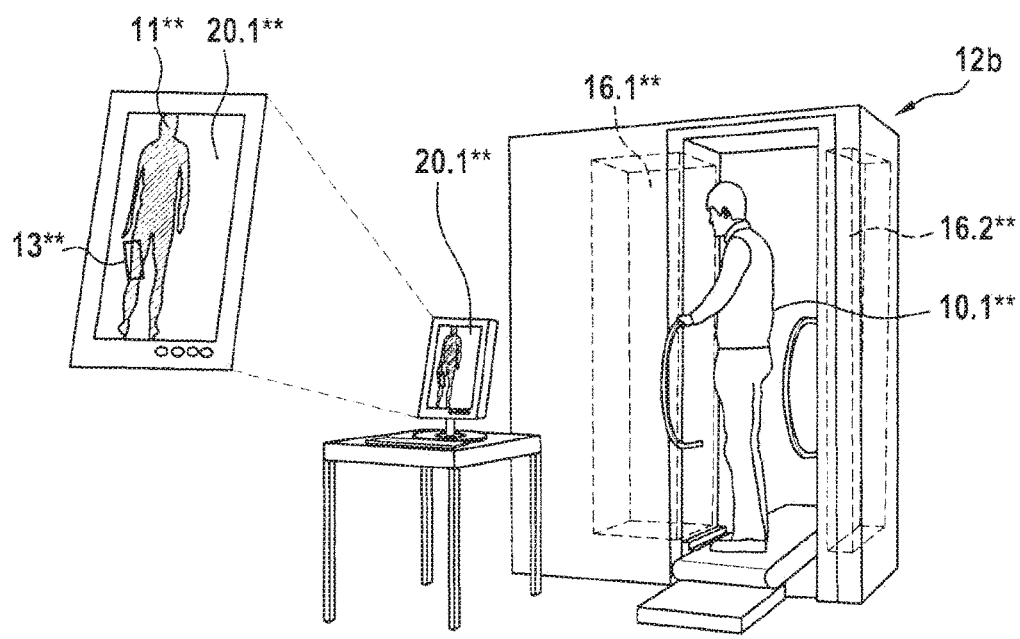
FIG. 3 shows a second exemplary embodiment of a screening device for automatically screening a person for concealed objects, with an inspection device for contactless inspection of the person.

FIG. 3 shows a second example of one possible embodiment of a first screening device 12b, in which an inspection device (not shown in detail) is provided for contactless inspection of the person 10.1 for concealed objects, using transmission X-ray technology. For this purpose, the person 10.1 is conveyed on a transport belt by a system of the screening device 12b, comprising a device 16.1 for generating an X-ray fan beam, and a detection device 16.2 for detecting X-rays not absorbed by the person 10.1. Based on the X-rays that are detected with the detection device 16.2, a full-body transmission image (X-ray image) of the person is generated and displayed to a security agent (not illustrated here, but similar to FIG. 2) on a display device 20.1. Similarly as for the embodiment shown in FIG. 2, suspicious areas on the person 10.1 for which a follow-up screening is necessary are displayed as a follow-up screening area 13 on a graphical representation 11.

As likewise indicated in FIG. 2, for the screening device 12b in FIG. 3, detection devices may be provided with a camera (not explicitly illustrated in FIG. 3) for generating a facial image of the person 10.1** as an identification feature; the designs of the possible cameras 34.1* and 34.3*, as explained in conjunction with FIG. 2, similarly or correspondingly apply for the arrangement in FIG. 3.

It is noted that the screening devices 12a and 12b explained by way of example in FIGS. 2 and 3 are used solely as an example for the screening device 12 illustrated in a general manner in FIG. 1. It is of course clear to those skilled in the art that other possible automatic inspection devices 16 for automatic and contactless screening of persons may likewise be used. Lastly, various inspection devices may also be combined in a screening device. For example, the inspection devices for the screening device 12a in FIG. 2 and the screening device 12b in FIG. 3 could also be combined into a single screening device 12.

Figure 4:
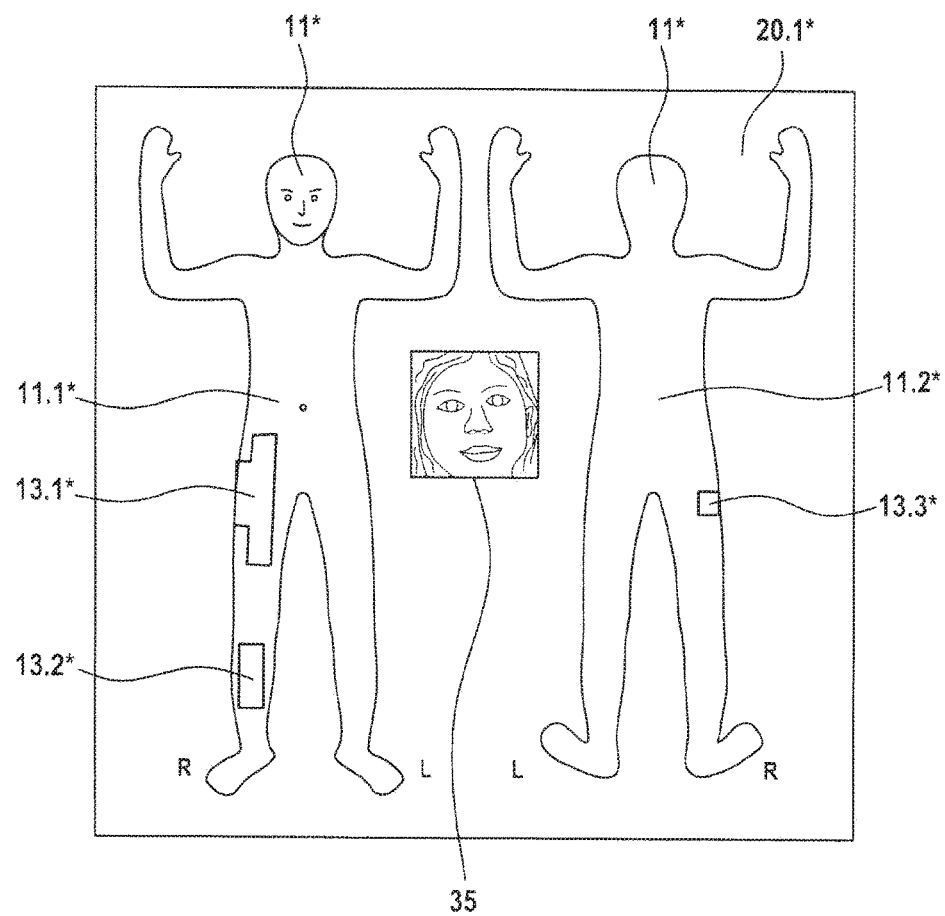
FIG. 4 shows one exemplary embodiment of the content of a display device for displaying a graphical representation of a person, with follow-up screening areas for the person that are displayed in a visually recognizable manner, according to one particular exemplary embodiment.

FIG. 4 shows by way of example the display content of the display unit 20.1* in FIG. 2 in an enlarged illustration. The display content 20.1* is made up of a generic graphical depiction of a representation or avatar 11* of the screened person. The avatar 11* is illustrated as a front view 11.1* and as a rear view 11.2*. In the course of the automatic and contactless inspection of the person, for example follow-up screening areas 13.1*, 13.2*, 13.3* have been determined which are highlighted in a visually recognizable manner in the respective front view 11.1\* and rear view 11.2\* of the avatar 11\*.

A visual marking may comprise, for example, a colored identification of a follow-up screening area. A security agent receives from the representation for the follow-up screening direct information concerning which bodily areas of the person are to be subjected to a follow-up screening. Thus, the information already detected by means of the screening device 12 or 12*a*, 12*b* concerning possibly concealed objects may be taken into account during the follow-up screening.

At each of the follow-up screening devices 26.1, 26.2, 26.3 (FIG. 1) it must be ensured that a person who is to undergo a follow-up screening is in fact associated with the follow-up screening area(s) displayed for the particular display unit 20.2, 20.3, 20.4. To this end, in the illustrated example (FIG. 4), an identification feature which is immediately visually checkable, together with the follow-up screening areas 13.1\*, 13.2\*, 13.3\*, is shown on the display 20.1\*. The identification feature is a facial image 35 of the person who is to undergo a follow-up screening. It is thus immediately possible for a security agent to associate the follow-up screening areas 13.1\*, 13.2\*, 13.3\*, displayed to the security agent on the anonymized graphical representation 11.1\*, 11.2\*, with the associated person who is to undergo a follow-up screening. An incorrect association at the follow-up screening points 26.1, 26.2, 26.3 is thus effectively avoided, even when a waiting line has formed. The occurrence of a security gap, described at the outset, may thus be avoided without increased staffing.

Figure 5:
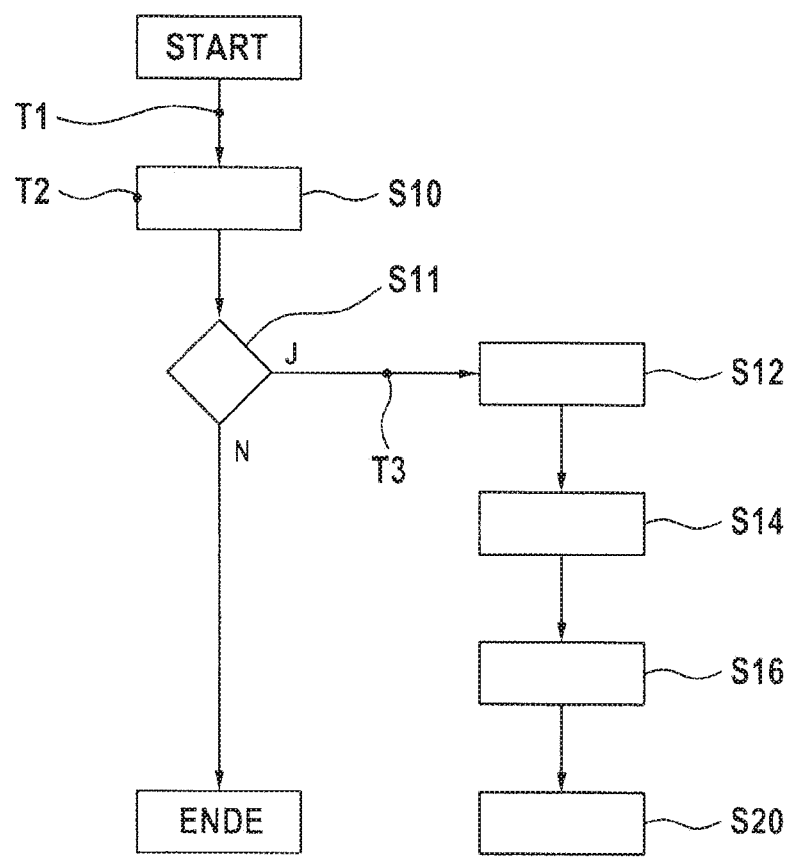
FIG. 5 shows a flow chart for illustrating a screening method for automatically screening a person for concealed objects, according to one exemplary embodiment of the disclosure.

FIG. 5 shows a simplified flow chart of a screening method for automatically screening persons for concealed objects.

After the method starts, a person is screened for concealed objects by means of a contactless inspection method in a step S10.

In step S10, the person to be screened is scanned, for example with X-rays or electromagnetic millimeter waves, in order to generate a backscatter image of the bodily surface of the person as the basis for an automatic detection of concealed objects. It is also conceivable to scan the person to be screened with penetrating X-rays, and on this basis to generate a transmission image of the person as the basis for the automatic detection of concealed objects on or in the person.

If (in a step S11) areas to be subjected to a follow-up screening for the person are determined during this screening due to the fact that the automatic inspection method has found possible concealed objects on the person, the method continues to step S12.

Data defining the follow-up screening area are stored in a data set in step S12.

The method subsequently goes to step S14, in which a unique identification feature for the person is generated, based on a detected external feature of the person.

The method subsequently goes to step S16, in which the generated identification feature is associated with the data set that determines the follow-up screening area of the person.

The method then goes to a step S20 as the interface with another screening method, in which a more accurate screening of the follow-up screening areas determined for the person takes place.

If (in step S11) it has been established that no follow-up screening area was determined during the contactless inspection of the person, this means that the person has automatically been classified by the system as unobjectionable. The screening method then ends for this person and goes to step END.

A step for detecting an external feature of the person may in principle be integrated into the method at times T1, T2, or T3; i.e., the detection of an external feature of the person as the basis for the unique identification feature may in principle take place before, during, or after the automatic screening of the person. If it has been generated before or during the automatic screening, the detected external feature may be immediately deleted as soon as it is established that no follow-up screening area has been determined for the person.

In one particular refinement it may be provided that in step S12, for example, the basis for the unique identification feature for the person is generated based on features of the person that are detected by means of the contactless inspection method in step S10. As already explained elsewhere, for example an image of the face of the person, which has been acquired by scanning with reflected X-rays or millimeter waves, could be used as a unique identification feature for the person.

Figure 6:
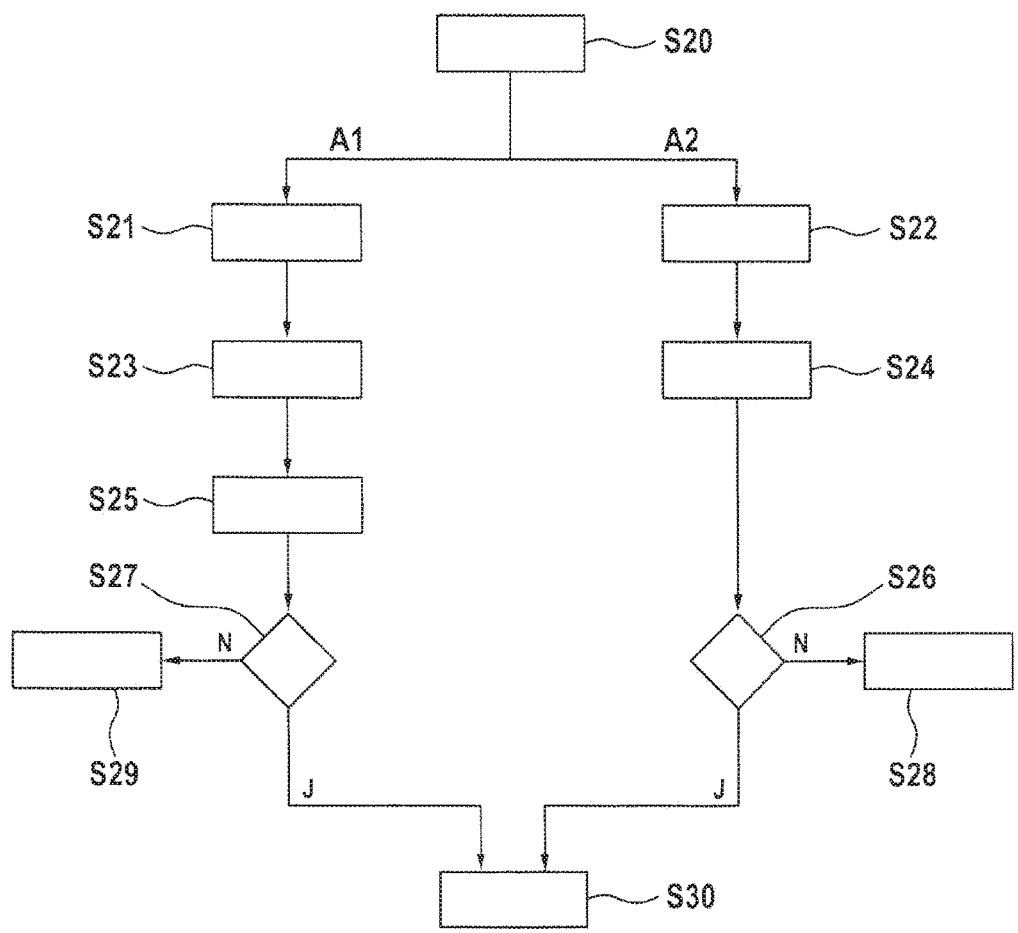
FIG. 6 shows one exemplary embodiment of a follow-up screening method for subjecting a person to a follow-up screening in order to find concealed objects, based on the display of a graphical representation of the person, on which a follow-up screening area for the person is displayed in a visually recognizable manner, according to one exemplary embodiment.

FIG. 6 shows a schematic flow chart diagram of a follow-up screening method for the follow-up screening of a person in order to find concealed objects. The follow-up screening method explained in conjunction with FIG. 6 is, for example, carried out within the scope of a multi-stage screening method following a screening method according to FIG. 5, when a follow-up screening area for the person has been determined in the latter. Thus, the follow-up screening method in FIG. 6 begins with step S20, in which, corresponding to a data set associated with the person, a visually recognizable follow-up screening area is displayed on a graphically depicted representation of the person (avatar).

According to a first alternative A1 of the method, the method goes to a step S21, in which the same external feature of the person is detected as when the screening method in FIG. 5 is carried out.

The unique identification feature for the person, based on the detected external feature, is generated in a next step S23, likewise corresponding to the method in FIG. 5.

In a subsequent step S25, it is verified that a follow-up screening area, displayed on the display device, is associated with a person present there who is to undergo a follow-up screening. For this purpose, the unique identification feature generated at the follow-up screening point is checked for agreement with the identification feature that is associated with a displayed follow-up screening area. Alternatively, by use of the identification feature that is generated at the follow-up screening point, the associated data set, which determines the follow-up screening area for the person, may be identified at a data source and retrieved therefrom. The data source may be the central data server 40 (FIG. 1) of the checkpoint via which the corresponding first screening device 12, on which the method according to FIG. 5 is carried out, as well as the corresponding follow-up screening devices 26.1 through 26.3, on which the method according to FIG. 6 is in each case carried out, are connected via suitable data links 41.1 or 41.2, 41.3, and 41.4. As already noted elsewhere, the data server 40 is connected in a known manner to the screening device 12 and to the follow-up screening devices 26.1 through 26.3 via a computer network (LAN and/or WAN). Therefore, in principle the data server 40 may be situated in the area of the control point 1 or spatially remotely from same.

If it is established in a step S27 that the follow-up screening area displayed on the display device (20.2, for example) at the follow-up screening device (26.1, for example) does not match the person (30.2, for example) who is to undergo a follow-up screening, the person (30.2) in question in the waiting line 28 may have possibly exchanged places with another person (30.1, for example) in the waiting line 28 prior to the follow-up screening points 26.1, 26.2, 26.3. Accordingly, it is to be assumed that an appropriate alarm notification is triggered at another follow-up screening point (26.2, for example). This means that in this specific situation, which is only an example, the two persons (30.1, 30.2) must switch follow-up screening points (26.1, 26.2), and the method in each case then begins once more at step S20.

If it has been established in step S27 that the person who is to undergo a follow-up screening is associated with the displayed follow-up screening area, the appropriate follow-up screening of the person may take place in a subsequent step S30.

According to an alternative embodiment A2 of the follow-up screening method, after step S20 the method goes to step S22.

In step S22, together with a displayed follow-up screening area, an associated identification feature at a prior control point (for example, 12 in FIG. 1) together with the follow-up screening area are displayed. This may be a photograph, for example a facial photograph, of the person who is to undergo a follow-up screening.

In a subsequent step S24, it is verified by visual means that the displayed follow-up screening area is associated with the person who is present at the follow-up screening point, by comparing the displayed identification feature to the person.

If the security agent determines a match in a step S26, the method likewise goes to step S30, in which the follow-up screening of the person may take place corresponding to the displayed follow-up screening areas.

If the visual comparison shows that the person who is present at the follow-up screening point does not match the displayed identification feature, in a step S28 the person is led to one of the other follow-up screening points, similarly as for step S29 in alternative A1. At this location the method likewise begins again at step S20.

Lastly, it is noted that the screening method explained in conjunction with FIG. 5 in combination with the follow-up screening method explained with reference to FIG. 6 together form a multi-stage screening method. In such a multi-stage screening method, it is not possible for a security gap to occur, even when a waiting line has formed in front of the follow-up screening points.

In summary, a multi-stage screening system having at least one screening device at a first location and at least one follow-up screening point at a second location, having a follow-up screening device, has been proposed herein. For automatically screening a person for concealed objects, the screening device has an inspection device for contactless inspection of the person, and is configured for determining a follow-up screening area of the person and storing data defined by the follow-up screening area in a data set, and for generating, based on a detected external feature of the person, a unique identification feature for the person and associating same with the data set of the person. The follow-up screening device has a display device for displaying a graphical representation of a person, the display device being configured for displaying in a visually recognizable manner a follow-up screening area of the person in order to find concealed objects, corresponding to a data set that is associated with the person. The follow-up screening device may be configured for generating the unique identification feature for the person, based on a detected feature of the person. Alternatively, the follow-up screening device may be configured for displaying an identification feature, in particular a photograph (e.g., a facial photograph), of the person, which is associated with the data set of a follow-up screening area at another control point, for visual verification that the data set is associated with the person. Moreover, the disclosure relates to a corresponding screening method, a corresponding follow-up screening method, and a corresponding multi-stage screening method.

The invention claimed is:

1. A screening device for automatic and contactless screening of a person for concealed objects, the screening device comprising:
   an inspection device configured for scanning a person to be screened, the inspection device including a transmitter/receiver unit configured to scan the person with at least one of X-rays or electromagnetic millimeter waves and to generate a data set of the person,
   a detection unit coupled with the inspection device, the detection unit configured to detect an external biometric feature of the person,
   a control device coupled with the inspection device, the control device configured to:
      determine a follow-up screening area of the person;
      store data defined by the follow-up screening area in the data set of the person; and
      generate a unique identification feature for the person based on the detected external feature of the person; and
      associate the unique identification feature with the data set of the person, and
   a display device located at the follow-up screening area and coupled with the control device, the display device configured to selectably display both the unique identification feature of the person and the data set of the person at the follow-up screening area.

2. The screening device according to claim 1, wherein the external biometric feature comprises at least one of the papillary pattern of a finger of the person, the hand geometry on a hand of the person, the palm lines on a hand of the person, the iris structure of at least one eye of the person, the retina structure of at least one eye of the person, the build of the person, the height of the person, or an estimated weight of the person.

3. The screening device according to claim 1, wherein the detection unit comprises at least one image acquisition unit, the image acquisition unit being configured for generating at least one of a photograph of the person or a facial photograph of the person as the unique identification feature.

4. The screening device according to claim 1, wherein the inspection device is further configured to generate at least one of a transmission image of the person or a backscatter image of the bodily surface of the person.

5. The screening device according to claim 1, wherein the unique identification feature comprises at least one of the gender of the person, the height of the person, or an estimated weight of the person.

6. The screening device according to claim 1, wherein the display device configured for displaying a graphical representation of at least one of the person or the follow-up area based on the at least one of the unique identification feature of the person or the data set of the person.

7. The screening device according to claim 1, wherein the control device is integral to the inspection device.

8. A multi-stage screening system, comprising:
at least one screening device configured for scanning a person to be screened, the at least one screening device comprising;
an inspection device configured for scanning a person to be screened, the inspection device including a transmitter/receiver unit configured to scan the person with at least one of X-rays or electromagnetic millimeter waves and to generate a data set of the person,
a detection unit coupled with the inspection device, the detection unit configured to detect an external biometric feature of the person,
a control device coupled with the inspection device, the control device configured to:
determine a follow-up screening area of the person;
store data defined by the follow-up screening area in the data set of the person;
generate a unique identification feature for the person based on a detected external feature of the person; and
associate the unique identification feature with the data set of the person;
at least one follow-up screening device configured for selectably displaying a graphical representation of the person based on the unique identification feature of the person and the data set of the person.

9. The multi-stage screening system according to claim 8, wherein the graphical representation presented via the display device comprises at least one of a photograph of the person or a facial photograph of the person.

10. The multi-stage screening system according to claim 8, wherein the at least one screening device is positioned at a first control point, and the at least one follow-up screening device is positioned at a second control point.

11. The multi-stage screening system according to claim 8, wherein the at least one screening device or the at least one follow-up screening device further includes an image acquisition unit, the image acquisition unit being configured for generating at least one of a photograph of the person or a facial photograph of the person as the unique identification feature.

12. The multi-stage screening system according to claim 8, wherein the at least one follow-up screening device is further configured to:
generate a unique identification feature for the person based on a detected external feature of the person; and
compare the unique identification feature of the person generated at the at least one follow-up screening device to the unique identification feature generated at the at least one screening device to verify that the graphical representation displayed is associated with a person to be screened at the follow-up screening device.

13. A method for automatically screening a person for concealed objects, the method comprising:
scanning, by an inspection device, a person to be screened, the inspection device including a transmitter/receiver unit configured to scan the person with at least one of X-rays or electromagnetic millimeter waves and to generate a data set of the person;
detecting, by a detection device, an external biometric feature of the person;
determining, by a control device, a follow-up screening area of the person;
storing data defined by the follow-up screening area in the data set of the person;
generating, by the control device, a unique identification feature for the person based on the detected external feature of the person;
associating the unique identification feature with the data set of the person; and
displaying selectably, by a display of at least one follow-up screening device, the data set of the person and the unique identification of the person.

14. The method according to claim 13, further comprising:
transmitting the unique identification feature of the person or the data set of the person to the at least one follow-up screening device;
displaying, by the display of the at least one follow-up screening device, a graphical representation of at least one of the person or the follow-up screening area based on the the unique identification feature of the person or the data set of the person; and
verifying that the at least one of the unique identification feature of the person or the data set of the person is associated with the person to be screened at the at least one follow-up screening device.

15. The method according to claim 14, further comprising:
generating, at the at least one follow-up screening device, the unique identification feature for the person based on the detected external feature of the person;
comparing the unique identification feature of the person generated at the at least one follow-up screening device to the unique identification feature generated at the at least one screening device to verify that the graphical representation displayed is associated with the person to be screened at least one follow-up screening device.

* * * * *